June 29, 1937. B. PERILLO 2,085,385
EMERGENCY WHEEL BRAKE
Original Filed Sept. 18, 1935  2 Sheets-Sheet 1
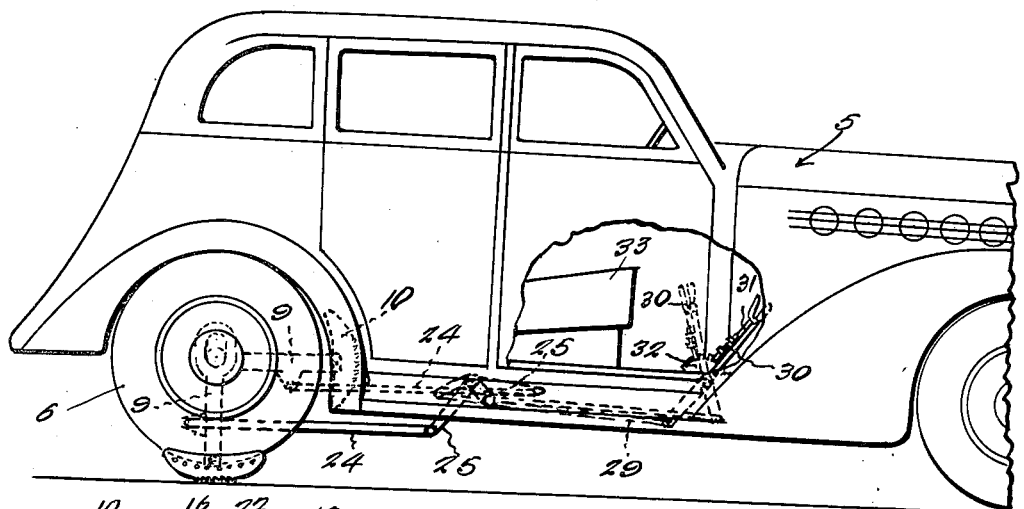
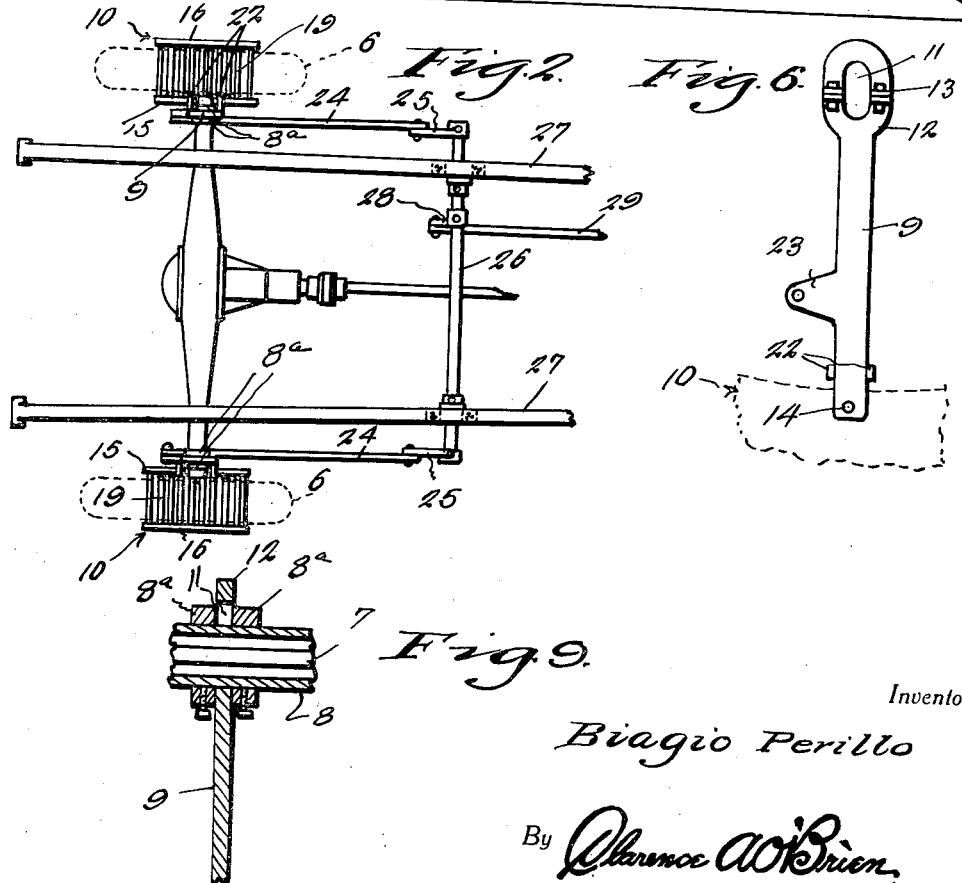
Inventor
Biagio Perillo
By Clarence A. O'Brien
Attorney June 29, 1937.                B. PERILLO                2,085,385
                            EMERGENCY WHEEL BRAKE
                    Original Filed Sept. 18, 1935    2 Sheets-Sheet 2
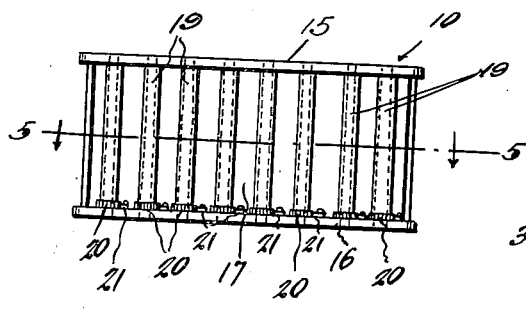
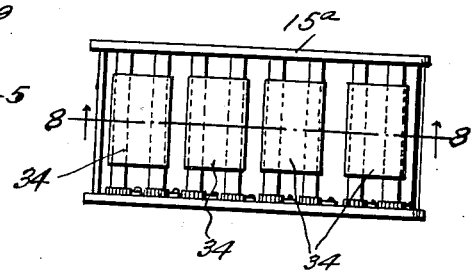
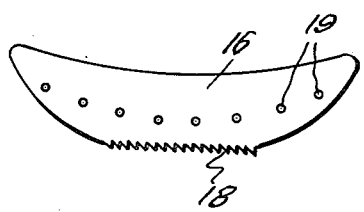
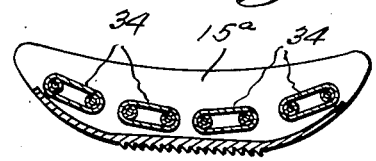
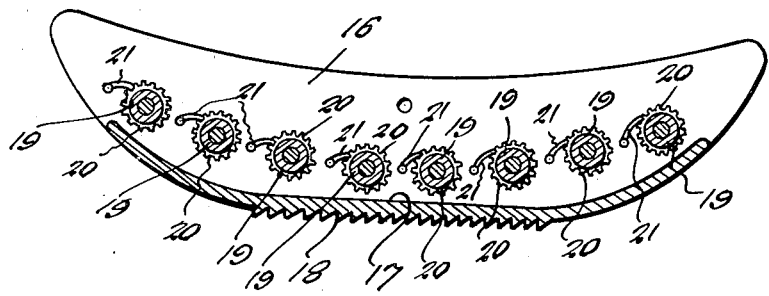
Inventor
Biagio Perillo
By Clarence A O'Brien
Attorney Patented June 29, 1937

2,085,385

UNITED STATES PATENT OFFICE 2,085,385

EMERGENCY WHEEL BRAKE

Biagio Perillo, Jeannette, Pa., assignor of twenty per cent to Joseph Perillo, twenty per cent to Mike Ezzi, and twenty per cent to Louis Vella, Jeannette, Pa.

Application September 18, 1935, Serial No. 41,164
Renewed March 26, 1937

3 Claims. (Cl. 188—4)

This invention appertains to new and useful improvements in the general art of brakes and more particularly to an emergency brake for vehicle wheels.

The principal object of the present invention is to provide an emergency brake for aeroplanes, trucks, busses and standard passenger cars wherein the brake is adapted to be interposed between the wheels of the vehicle and ground in a substantially instantaneous manner wherein the rotating wheels assist in bringing the braking element to braking position.

Another important object of the invention is to provide a ground engaging brake wherein the vehicle can be readily removed from the brake when releasement of the brake is desired.

These and various other important objects and advantages of the invention will become apparent to the reader of the following specification.

In the drawings:

Figure 1 represents a side elevational view of an automobile equipped with the novel brake means.

Figure 2 represents a fragmentary top plan view showing the frame of an automobile and the novel brake structures.

Figure 3 is a top plan view of one of the brake units.

Figure 4 represents a side elevational view of one of the brake units.

Figure 5 is an enlarged longitudinal sectional view taken substantially on line 5—5 of Figure 3.

Figure 6 is a side elevational view of one of the hanger bars.

Figure 7 represents a top plan view of a slightly modified form of braking unit.

Figure 8 represents a longitudinal sectional view taken substantially on line 8—8 of Figure 7.

Figure 9 represents a fragmentary detail sectional view through the axle housing showing the manner in which the hanger is supported thereon.

Referring to the drawings wherein like numerals designate like parts, it can be seen that numeral 5 generally refers to the body of an automobile while numeral 6 represents the usual rear wheels thereof located on the axle 7 (see Figure 9) extending through the axle housing 8.

Numeral 9 is a hanger bar, one for each of the braking units generally referred to by numeral 10. This hanger bar is provided with an ovate-shaped longitudinally extending opening 11 at its upper end which is enlarged as at 12 and divided into a pair of sections folded together as at 13. The axle housing 8 extends through this opening 11 as shown in Figure 9 and the lower end is pivotally connected as at 14 to the inboard plate 15 of the corresponding brake unit 10. Each of these units 10 is made up of the inboard plate 15 and the outboard plate 16 with a ground engaging plate 17 connecting the lower edges thereof. The bottom side of this plate 17 is transversely serrated as at 18 to effect a good grip on the ground when the unit is engaged therewith.

Roller bearings arranged on an arc concentric with the wheel with which they are to engage are denoted by numeral 19 and each is provided with a gear wheel 20 at one end thereof, adjacent the outboard plate 16 of the unit. The outboard plate 16 carries a plurality of pawls 21, one for each of the gears or ratchet wheels 20, so that these bearings 19 are capable of rotating in only one direction. Stop members 22 are provided at the lower end of the hanger bar 9 to limit rocking motion of the braking unit 10.

A projection 23 extends rearwardly of the bar 9 when the same is in a vertical position as shown in Figure 6 and to this connects the elongated connecting rod 24 which at its forward end connects the arm 25 on the transverse shaft 26 supported by the frame 27 of the vehicle. This shaft 26 is provided with an arm 28 from which extends the connecting rod 29 to the lower end of the rockable hand lever 30 which has a detent 31 engaging with the adjacent rack 32, this hand lever and rack 32 being located adjacent the driver's seat denoted by numeral 33. (See Figure 1.)

Figures 7 and 8 show a slightly modified form wherein certain pairs of the roller bearings 19 are connected by belts or webs 34.

Obviously when the hand lever 30 is released, the units 10 will drop until they engage the ground whereupon the wheels 6 ride upon the same, but are prevented from riding over the same by the connecting rods 24. When it is desired to let the car off of the brake units, the car is reversed and driven off backwards for in this direction of travel of the rear wheel 6, the rollers 19 cannot turn.

Furthermore, the protuberance 23 is disposed laterally of the bar 9 as shown in Figure 6 so that when the brake units 10 are pulled upwardly they will be effectively concealed behind the mudguards of the vehicle.

While the foregoing specification sets forth the invention in specific terms, it is to be understood that numerous changes in the shape, size and materials may be resorted to without departing from the spirit or scope of the invention as claimed hereinafter.

Having described the invention, what is claimed as new is:

1. An emergency brake for wheeled vehicles comprising a ground engaging brake unit, means for swinging the unit to ground engaging position, roller bearings on the unit for supporting a vehicle wheel, and endless webs trained over certain groups of the said roller bearings.

2. An emergency brake for vehicle wheels comprising a swingably mounted ground engaging unit, said unit being provided with roller bearings upon which a wheel of a vehicle can ride, said roller bearings being freely rotatable in one direction, and means for preventing rotation of the roller bearing in the opposite direction, certain of the said roller bearings being connected together to operate it in unison.

3. An emergency brake for vehicle wheels comprising a swingably mounted ground engaging unit, said unit being provided with roller bearings upon which a wheel of a vehicle can ride, said roller bearings being freely rotatable in one direction, and means for preventing rotation of the roller bearing in the opposite direction, and a flexible endless web connecting certain groups of the said roller bearings.

BIAGIO PERILLO.